(12) United States Patent
McAllister (10) Patent No.: US 10,476,130 B2
(45) Date of Patent: Nov. 12, 2019

(54) AERIAL INVENTORY ANTENNA

(71) Applicant: Clarke William McAllister, Eugene, OR (US)

(72) Inventor: Clarke William McAllister, Eugene, OR (US)

(73) Assignee: ADASA Inc., Eugene, OR (US)

( * ) Notice: Subject to any disclaimer, the term of this patent is extended or adjusted under 35 U.S.C. 154(b) by 0 days.

(21) Appl. No.: 16/036,852

(22) Filed: Jul. 16, 2018

(65) Prior Publication Data

US 2018/0342787 A1 Nov. 29, 2018

Related U.S. Application Data

(63) Continuation-in-part of application No. 15/691,739, filed on Aug. 30, 2017, now Pat. No. 10,050,330, (Continued)

(51) Int. Cl.
| | |
|---|---|
| *H01Q 1/22* | (2006.01) |
| *H01Q 1/28* | (2006.01) |
| *H01Q 7/00* | (2006.01) |
| *H01Q 19/02* | (2006.01) |
| *G06K 7/10* | (2006.01) |
| *H01Q 1/36* | (2006.01) |
| *H01Q 11/08* | (2006.01) |

(Continued)

(52) U.S. Cl.
CPC ....... *H01Q 1/2216* (2013.01); *G06K 7/10346* (2013.01); *H01Q 1/28* (2013.01); *H01Q 1/362* (2013.01); *H01Q 7/00* (2013.01); *H01Q 11/08* (2013.01); *H01Q 19/021* (2013.01); *G06Q 10/087* (2013.01); *H01Q 19/28* (2013.01)

(58) Field of Classification Search
CPC .......... H01Q 1/2216; H01Q 7/00; H01Q 1/28; H01Q 1/362; H01Q 19/021; G06K 7/10316

See application file for complete search history.

(56) References Cited

U.S. PATENT DOCUMENTS

| | | | |
|---|---|---|---|
| 300,827 A | 6/1884 | Adams | |
| 552,271 A | 12/1895 | Bolton | |

(Continued)

FOREIGN PATENT DOCUMENTS

| | | |
|---|---|---|
| EP | 1913235 | 7/2006 |
| EP | 1770591 A2 | 4/2007 |

(Continued)

OTHER PUBLICATIONS

Claire Swedberg, Robotic RFID Reader Automates Inventory Tracking, RFID Journal, Nov. 28, 2012.

(Continued)

*Primary Examiner* — Albert K Wong (57) ABSTRACT

The present invention teaches a frequency-scalable high-gain dual-polarization radio beam application platform for private, public, government, or military radio applications such as RFID (radio frequency identification), aerial and robotic inventory scanning, radio communications, telemetry, telecommand, aeronautical radionavigation, radiolocation, earth exploration, space research for terrestrial, air-to-ground, space-to-earth, or space-to-space uses.

13 Claims, 7 Drawing Sheets

Related U.S. Application Data which is a continuation-in-part of application No. 15/286,560, filed on Oct. 6, 2016, now Pat. No. 9,780,435, which is a continuation-in-part of application No. 14/311,215, filed on Jun. 20, 2014, now abandoned, which is a continuation-in-part of application No. 13/693,026, filed on Dec. 3, 2012, now Pat. No. 9,747,480.

(60) Provisional application No. 61/989,823, filed on May 7, 2014, provisional application No. 61/879,054, filed on Sep. 17, 2013, provisional application No. 61/838,186, filed on Jun. 21, 2013, provisional application No. 61/709,771, filed on Oct. 4, 2012, provisional application No. 61/708,207, filed on Oct. 1, 2012, provisional application No. 61/677,470, filed on Jul. 30, 2012, provisional application No. 61/567,117, filed on Dec. 5, 2011.

(51) Int. Cl.
*G06Q 10/08* (2012.01)
*H01Q 19/28* (2006.01)

(56) References Cited

U.S. PATENT DOCUMENTS

| | | | |
|---|---|---|---|
| 572,036 A | 11/1896 | Theryc |
| 2,190,717 A | 2/1940 | Kukop |
| 2,573,401 A | 10/1951 | Carter |
| 2,993,204 A | 7/1961 | Macalpine |
| 3,101,472 A | 8/1963 | Goubau |
| 3,336,530 A | 8/1967 | Sloan |
| 3,500,427 A | 3/1970 | Landesman |
| 3,699,585 A | 10/1972 | Morrison |
| 3,755,815 A | 8/1973 | Stangel |
| 3,766,558 A | 10/1973 | Kuechken |
| 3,836,979 A | 9/1974 | Kurland |
| 3,864,689 A | 2/1975 | Young |
| 4,023,167 A | 5/1977 | Wahlstrom |
| 4,129,866 A | 12/1978 | Turco |
| 4,163,233 A | 7/1979 | Becker |
| 4,203,105 A | 5/1980 | Dragone |
| 4,223,830 A | 9/1980 | Walton |
| 4,250,508 A | 2/1981 | Dragone |
| 4,278,977 A | 7/1981 | Nossen |
| 4,442,438 A | 4/1984 | Siwiak |
| 4,471,345 A | 9/1984 | Barrett |
| 4,476,469 A | 10/1984 | Lander |
| 4,598,275 A | 7/1986 | Ross |
| 4,636,950 A | 1/1987 | Caswell |
| 4,673,932 A | 6/1987 | Eckchian |
| 4,779,097 A | 10/1988 | Morchin |
| 4,809,178 A | 2/1989 | Ninomiya |
| 4,918,425 A | 4/1990 | Greenburg |
| 4,935,747 A | 6/1990 | Yuichi |
| 5,019,815 A | 5/1991 | Lemelson |
| 5,036,308 A | 7/1991 | Fockens |
| 5,146,235 A | 9/1992 | Frese |
| 5,155,684 A | 10/1992 | Burke |
| 5,165,064 A | 11/1992 | Mattaboni |
| 5,214,410 A | 5/1993 | Verster |
| 5,266,925 A | 11/1993 | Vercellotti |
| 5,280,159 A | 1/1994 | Schultz |
| 5,347,286 A | 9/1994 | Babitch |
| 5,381,137 A | 1/1995 | Ghaem |
| 5,382,784 A | 1/1995 | Eberhardt |
| 5,500,650 A | 3/1996 | Snodgrass |
| 5,530,330 A | 6/1996 | Baiden |
| 5,583,850 A | 12/1996 | Snodgrass |
| 5,621,199 A | 4/1997 | Calari |
| 5,627,544 A | 5/1997 | Snodgrass |
| 5,689,238 A | 11/1997 | Cannon |
| 5,708,423 A | 1/1998 | Ghaffafi |
| 5,734,353 A | 3/1998 | Voorhies |
| 5,763,867 A | 6/1998 | Main |
| 5,785,181 A | 7/1998 | Quartararo |
| 5,798,693 A | 8/1998 | Engellenner |
| 5,825,045 A | 10/1998 | Koenck |
| 5,825,298 A | 10/1998 | Walter |
| 5,850,187 A | 12/1998 | Carrender |
| 5,962,837 A | 10/1999 | Main |
| 5,974,078 A | 10/1999 | Tuttle |
| 5,986,570 A | 11/1999 | Black |
| 5,990,847 A | 11/1999 | Filipovic |
| 5,995,017 A | 11/1999 | Marsh |
| 6,002,344 A | 12/1999 | Bandy |
| 6,076,025 A | 6/2000 | Ueno |
| 6,078,251 A | 6/2000 | Landt |
| 6,122,329 A | 9/2000 | Zai |
| 6,130,613 A | 10/2000 | Eberhardt |
| 6,184,841 B1 | 2/2001 | Shober |
| 6,195,006 B1 | 2/2001 | Bowers |
| 6,195,053 B1 | 2/2001 | Kodukula |
| 6,354,493 B1 | 3/2002 | Mon |
| 6,397,063 B1 | 5/2002 | Sessions |
| 6,414,626 B1 | 7/2002 | Greef |
| 6,415,978 B1 | 7/2002 | McAllister |
| 6,459,726 B1 | 10/2002 | Ovard |
| 6,486,780 B1 | 11/2002 | Garber |
| 6,653,987 B1 | 11/2003 | Lamensdorf |
| 6,677,852 B1 | 1/2004 | Landt |
| 6,724,308 B2 | 4/2004 | Nicholson |
| 6,809,490 B2 | 10/2004 | Jones |
| 6,830,181 B1 | 12/2004 | Bennett |
| 7,023,341 B2 | 4/2006 | Stilp |
| 7,056,185 B1 | 6/2006 | Anagnostou |
| 7,057,492 B2 | 6/2006 | Jackson |
| 7,068,210 B1 | 6/2006 | Atindra |
| 7,075,435 B2 | 7/2006 | Jesser |
| 7,118,036 B1 | 10/2006 | Couch |
| 7,119,738 B2 | 10/2006 | Bridgelall |
| 7,223,030 B2 | 5/2007 | Fessler |
| 7,236,091 B2 | 6/2007 | Kiang |
| 7,245,215 B2 | 7/2007 | Gollu |
| 7,250,845 B2 | 7/2007 | Mick |
| 7,265,674 B2 | 9/2007 | Tuttle |
| 7,319,397 B2 | 1/2008 | Chung |
| 7,321,305 B2 | 1/2008 | Gollu |
| 7,400,989 B2 | 7/2008 | Chapman |
| 7,427,955 B2 | 9/2008 | Choi |
| 7,446,662 B1 | 11/2008 | Somogyi |
| 7,455,217 B2 | 11/2008 | Taylor |
| 7,538,946 B2 | 5/2009 | Smith |
| 7,548,166 B2 | 6/2009 | Roeder |
| 7,603,291 B2 | 10/2009 | Raiyani |
| 7,669,763 B2 | 3/2010 | Ernesti |
| 7,693,757 B2 | 4/2010 | Zimmerman |
| 7,733,230 B2 | 6/2010 | Bomber |
| 7,747,477 B1 | 6/2010 | Louis |
| RE41,531 E | 8/2010 | Wood |
| RE41,562 E | 8/2010 | Dando |
| 7,821,391 B2 | 10/2010 | Gupta |
| 7,822,424 B2 | 10/2010 | Markhovsky |
| 7,830,262 B1 | 11/2010 | Diorio |
| 7,876,224 B2 | 1/2011 | Prokopuk |
| 7,877,166 B2 | 1/2011 | Harwig |
| 7,916,028 B2 | 3/2011 | Oberle |
| 7,932,827 B2 | 4/2011 | Chand |
| 8,022,812 B2 | 9/2011 | Beniyama |
| 3,031,070 A1 | 10/2011 | Fabre |
| 8,072,311 B2 | 12/2011 | Sadr |
| 8,077,041 B2 | 12/2011 | Stern |
| 8,083,013 B2 | 12/2011 | Bewley |
| 8,085,150 B2 | 12/2011 | Oberle |
| 8,106,746 B2 | 1/2012 | Maltseff |
| 8,174,369 B2 | 5/2012 | Jones |
| 8,237,563 B2 | 8/2012 | Schatz |
| 8,289,129 B2 | 10/2012 | Bauchot |
| 8,294,554 B2 | 10/2012 | Shoarinejad |
| 8,412,450 B1 | 4/2013 | Huebner |
| 8,423,548 B1 | 4/2013 | Trandal |
| 8,430,192 B2 | 4/2013 | Gillett |

(56) References Cited

U.S. PATENT DOCUMENTS

| | | |
|---|---|---|
| 8,532,846 B2 | 9/2013 | Tollenaere |
| 8,542,114 B2 | 9/2013 | Stolarczyk |
| 8,556,173 B1 | 10/2013 | Huebner |
| 8,618,928 B2 | 12/2013 | Weed |
| 8,754,752 B2 | 6/2014 | Shoarinejad |
| 8,761,603 B1 | 6/2014 | Maleki |
| 9,061,102 B2 | 6/2015 | Levien |
| 9,067,671 B2 | 6/2015 | Stark |
| 2002/0005774 A1 | 1/2002 | Rudolph |
| 2002/0070862 A1 | 6/2002 | Francis |
| 2002/0165790 A1 | 11/2002 | Bancroft |
| 2003/0137268 A1 | 7/2003 | Papanikolopoulos |
| 2004/0074964 A1 | 4/2004 | Falkenrich-Wesche |
| 2005/0149226 A1 | 7/2005 | Stevens |
| 2005/0200457 A1 | 9/2005 | Bridgelall |
| 2005/0246248 A1 | 11/2005 | Vesuna |
| 2006/0068711 A1 | 3/2006 | Chiu |
| 2006/0114104 A1 | 6/2006 | Scaramozzino |
| 2007/0040684 A1* | 2/2007 | McAllister ............ B65C 9/1865 340/572.1 |
| 2007/0061041 A1 | 3/2007 | Zweig |
| 2007/0073513 A1 | 3/2007 | Posamentier |
| 2007/0131754 A1 | 6/2007 | Brandon |
| 2007/0176780 A1 | 8/2007 | Hart |
| 2007/0194929 A1* | 8/2007 | Wagner .............. G06K 7/10346 340/572.7 |
| 2007/0222665 A1 | 9/2007 | Koeneman |
| 2007/0252696 A1 | 11/2007 | Belisle |
| 2007/0282482 A1 | 12/2007 | Beucher |
| 2008/0042847 A1 | 2/2008 | Hollister |
| 2008/0068173 A1 | 3/2008 | Alexis |
| 2008/0077511 A1 | 3/2008 | Zimmerman |
| 2008/0106377 A1 | 5/2008 | Flores |
| 2008/0157967 A1 | 7/2008 | Jones |
| 2008/0191873 A1 | 8/2008 | Minerley |
| 2008/0191881 A1 | 8/2008 | Minerley |
| 2008/0224871 A1 | 9/2008 | Bolotin |
| 2008/0231457 A1 | 9/2008 | Mattice |
| 2008/0266092 A1 | 10/2008 | Campero |
| 2009/0012667 A1 | 1/2009 | Matsumoto |
| 2009/0016308 A1 | 1/2009 | Twitchell |
| 2009/0021351 A1 | 1/2009 | Beniyama |
| 2009/0146792 A1 | 6/2009 | Sadr |
| 2009/0231138 A1 | 9/2009 | Lai |
| 2009/0243924 A1 | 10/2009 | Twitchell |
| 2010/0049368 A1 | 2/2010 | Chen |
| 2010/0100269 A1 | 4/2010 | Ekhaguere |
| 2010/0109844 A1 | 5/2010 | Carrick |
| 2010/0131121 A1 | 5/2010 | Gerlock |
| 2010/0309017 A1 | 12/2010 | Ramchandran |
| 2010/0310019 A1 | 12/2010 | Sadr |
| 2011/0090059 A1 | 4/2011 | Sadr |
| 2011/0254664 A1 | 10/2011 | Sadr |
| 2011/0315765 A1 | 12/2011 | Schantz |
| 2012/0083945 A1 | 4/2012 | Oakley |
| 2012/0112904 A1 | 5/2012 | Nagy |
| 2012/0136630 A1 | 5/2012 | Murphy |
| 2012/0139704 A1 | 6/2012 | Sadr |
| 2012/0188058 A1 | 7/2012 | Lee |
| 2012/0197439 A1 | 8/2012 | Wang |
| 2012/0212331 A1 | 8/2012 | Jones |
| 2012/0271461 A1 | 10/2012 | Spata |
| 2012/0273284 A1 | 11/2012 | Nesnas |
| 2012/0274525 A1 | 11/2012 | Lam |
| 2012/0275546 A1 | 11/2012 | Divsalar |
| 2012/0293373 A1 | 11/2012 | You |
| 2013/0024219 A1 | 1/2013 | Martinez |
| 2013/0218721 A1 | 8/2013 | Borhan |
| 2013/0233964 A1 | 9/2013 | Woodworth |
| 2014/0032034 A1 | 1/2014 | Raptopoulos |
| 2014/0061377 A1 | 3/2014 | Smith |
| 2014/0197280 A1 | 7/2014 | Smith |
| 2014/0247116 A1 | 9/2014 | Davidson |
| 2014/0277854 A1 | 9/2014 | Jones |
| 2016/0316255 A1 | 10/2016 | Tseng |
| 2016/0365737 A1 | 12/2016 | Vladan |
| 2016/0371631 A1 | 12/2016 | Jetcheva |
| 2017/0174343 A1 | 6/2017 | Erickson |
| 2017/0178072 A1 | 6/2017 | Poomachandran |
| 2018/0006356 A1* | 1/2018 | McAllister ............ G06Q 10/087 |

FOREIGN PATENT DOCUMENTS

| | | |
|---|---|---|
| EP | 1941411 A2 | 7/2008 |
| EP | 2017768 A1 | 1/2009 |
| EP | 2205333 | 7/2010 |
| EP | 2484892 A2 | 8/2012 |
| WO | WO2005076929 | 8/2005 |
| WO | WO2006039119 | 4/2006 |
| WO | WO2006076283 | 7/2006 |
| WO | WO2007047510 | 4/2007 |
| WO | WO2007094868 | 8/2007 |
| WO | WO2008097509 | 8/2008 |
| WO | WO2008118875 | 10/2008 |
| WO | WO2009157653 A3 | 12/2009 |
| WO | WO2011088182 | 7/2011 |
| WO | WO2011135328 | 11/2011 |
| WO | WO2011135329 | 11/2011 |
| WO | WO2013071150 | 5/2013 |

OTHER PUBLICATIONS

Anderson, Ross, The Quadix, Apr. 19, 2004 1-4; https://www.yumpu.com/en/document/view/35443620/amateur-radio-antenna-projects-2004/1744.

Completech, ComAnt CAX+ Cross-Polarized YAGI; https://www.completech.fi/assets/CAX+.pdf.

* cited by examiner

AERIAL INVENTORY ANTENNA

RELATED APPLICATIONS

The present application is a continuation-in-part application of co-pending U.S. patent application Ser. No. 15/691,739 filed 30 Aug. 2017 which is a continuation-in-part application of U.S. patent application Ser. No. 15/286,560 filed 6 Oct. 2016 which is U.S. Pat. No. 9,780,435 and of expired U.S. patent application Ser. No. 14/311,215 filed 20 Jun. 2014 that claim priority and benefit based on U.S. patent application Ser. No. 13/693,026 filed on 3 Dec. 2012 by the same inventor Clarke W. McAllister. The present application also claims priority and benefit under 35 USC Section 119(e) of U.S. Provisional Application No. 62/238,105 filed on 6 Oct. 2015 all by the same inventor Clarke W. McAllister, the disclosures of which are expressly incorporated herein by reference. Also the following filed 7 May 2014, and 61/567,117 filed 5 Dec. 2011, and 61/677,470 filed 30 Jul. 2012, and 61/708,207 filed 1 Oct. 2012, and of 61/709,771 filed 4 Oct. 2012, all by the same inventor Clarke W. McAllister.

BACKGROUND

The present invention relates to an automated inventory scanning system, including methods and devices utilizing novel aerial scanning antennae, robots, unmanned aerial vehicles, and RFID (radio-frequency identification) transponders.

Robots are disclosed for aerial scanning using either propellers to lift an unmanned aerial vehicle (UAV), or a scissor lift mounted to a two-wheeled robot for maneuvering an RFID antenna to vertical storage spaces that are located well above floor level.

Radio-frequency identification (RFID) transponders enable improved identification and tracking of objects by encoding data electronically in a compact tag or label. Radio-frequency identification (RFID) transponders, typically thin transceivers that include an integrated circuit chip having radio frequency circuits, control logic, memory and an antenna structure mounted on a supporting substrate, enable vast amounts of information to be encoded and stored and have unique identification.

RFID transponders rank into two primary categories: active (or battery assist) RFID transponders and passive RFID transponders. Active RFID transponders include an integrated power source capable of self-generating signals, which may be used by other, remote reading devices to interpret the data associated with the transponder. Active transponders include batteries and, historically, are considered considerably more expensive than passive RFID transponders. Passive RFID transponders backscatter incident RF energy to remote devices such as interrogators.

Reflections from shelving and other metal objects in the field of an RFID reader are can blind and possibly saturate baseband amplifiers preventing tag reading. Circularly polarized (CP) antennae have vector rotation noise that results in periodic polarization misalignments with linearly polarized RFID transponders at quarter wavelength intervals from the CP antenna. Aerial RFID scanning also introduces significant ground-bounce problems that also result in poor RFID transponder interrogation performance. These and other problems are overcome by the presently disclosed invention. No prior art comprehensively teaches systems, methods or devices for moving among, overcoming carrier reflections, nulls, and ground bounce to automatically determine the location of RFID-tagged inventory.

SUMMARY OF THE INVENTION

In the present invention seven important problems are solved to make RFID inventory counting and localization a commercial reality for retail stores engaging in omnichannel retailing, including and especially for retailers that want to use their retail sales for as a forward warehouse for fulfillment of consumer's online orders for same day delivery or in-store pickup. In these highly competitive retail environments such as this, inventory errors can result in disastrous customer relationship problems when a retailer promises delivery or pickup of an item that is not actually in stock, ready to hand over to a waiting customer. Therefore it is in this context that the following eight solution criteria make sense from a retail business perspective: push-button inventory, safety, high availability, quiet operation, minimal disturbance to sales floor, centimeter location accuracy, and low capital expense.

Several prior art solutions, including those taught by the present inventor have not offered solutions that perform as well against these eight criteria as well as the present invention.

Push-button inventory solutions are achieved when RFID tags are read automatically. This usually means that some sort of RFID tag scanning is used. RF beams are either fixed or moving. Moving beams are either mechanically or electronically steered to various locations and vector angles. The present invention uses an electro-mechanical beam positioning system to steer RF interrogation beam(s), preferably to illuminate and interrogate each RFID tag without incurring direct labor to do so. Robotic solutions are used and optimal robotic mobility is used through aerial RFID scanning.

Safe movement of a robot requires separation of people and object from fast-moving parts of the robot, including the robot itself. In the present invention the requirements for overcoming the force of gravity to lift an move the mass required to form a beam, transmit RF energy, and collect RFID tag data is best achieved by employing lift from a scissor lift apparatus. In the present invention a modified Quadix antenna provides beam focusing from a high gain antenna that weighs only about 3-5 ounces or about 115 grams.

High availability is realized by the present invention by a two-wheeled robot that rolls through tagged inventory items and elevates a rotating scanning antenna to various altitudes of interest.

In retail sales environments a two-wheeled robot operates very quietly, having no loud moving parts.

Propeller wash is a blast of air that interferes with the shopping process by distracting shoppers and displacing retail inventory and displays. The present invention achieves this important design requirement by eliminating propellers. In the present invention the RFID scanning antenna is lifted to various altitudes by an expanding mechanical apparatus.

Centimeter accuracy enables high-resolution item localization accuracy.

Low capital expense relative to large arrays of fixed RFID readers is obvious, such solutions do not scale nearly as well as the present invention. That is because a single robot can read RFID tags over a much greater area than even the best long-range RFID readers. RF beam-steered RFID readers also have a high cost of the equipment and the wiring that is required to power them.

The present invention discloses devices for automatically reading and locating RFID-tagged assets including retail goods, automobiles, and commercial transport trailers.

Herein the term 'robot' is used interchangeably throughout this specification and the associated claims to mean either a rolling robot or a flying robot, such as a UAV, except where a specific meaning is explicitly stated.

Robots of the present invention are optimized and disclosed and claimed for reading RFID tags in retail store environments where metal display racks and shelves reduce the read rate and inventory accuracy of systems that fail to avoid blinding reflections from typical indoor propagation environments. The present invention overcomes limitations of prior art by avoiding unwanted carrier signal reflection paths by using novel scanning devices, features, and methods.

DESCRIPTION OF THE INVENTION

Making reference to various figures of the drawings, possible embodiments of the present invention are described and those skilled in the art will understand that alternative configurations and combinations of components may be substituted without subtracting from the invention. Also, in some figures certain components are omitted to more clearly illustrate the invention, similar features share common reference numbers.

To clarify certain aspects of the present invention, certain embodiments are described in a possible environment—as identification means for retail items that are bought and used by consumers. In these instances, certain methods make reference to items such as clothing, garments, shoes, consumables, electronics, and tires, but other items may be used by these methods. Certain embodiments of the present invention are directed for identifying objects using RFID transponders in supply chains, retail stores, warehouses, and distribution centers—both indoors and outdoors.

Some terms are used interchangeably as a convenience and, accordingly, are not intended as a limitation. For example, transponder is a term for wireless sensors that is often used interchangeably with the term tags and the term inlay, which is used interchangeably with inlet. This document generally uses the term tag or RF tag to refer to passive inlay transponders, which do not include a battery, but include an antenna structure coupled to an RFID chip to form an inlay which is generally thin and flat and substantially co-planar and may be constructed on top of a layer of foam standoff, a dielectric material, or a folded substrate. One common type of passive inlay transponder further includes a pressure-sensitive adhesive backing positioned opposite an inlay carrier layer. Chipless RFID transponders are manufactured using polymers instead of silicon for cost reduction. Graphene tags offer similar benefits. Inlays are frequently embedded in hang tags, pocket flashers, product packaging, and smart labels. A third type: a battery-assist tag is a hybrid RFID transponder that uses a battery to power the RFID chip and a backscatter return link to the interrogator.

The systems, methods, and devices of the present invention utilize an RFID transponder or wireless sensors as a component. Certain RFID transponders and wireless sensors operate at Low Frequencies (LF), High Frequencies (HF), Ultra High Frequencies (UHF), and microwave frequencies. HF is the band of the electromagnetic spectrum that is centered around 13.56 MHz. UHF for RFID applications spans globally from about 860 MHz to 960 MHz. Transponders and tags responsive to these frequency bands generally have some form of antenna. For LF or HF there is typically an inductive loop. For UHF there is often an inductive element and one or more dipoles or a microstrip patch or other microstrip elements in their antenna structure. Such RFID transponders and wireless sensors utilize any range of possible modulation schemes including: amplitude modulation, amplitude shift keying (ASK), double-sideband ASK, phase-shift keying, phase-reversal ASK, frequency-shift keying (FSK), phase jitter modulation, time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. Wireless sensors are reused according to certain methods disclosed herein. UWB wireless sensors may be combined with narrowband, spread spectrum, or frequency-hopping inlays or wireless sensors.

A common cause for RFID tags to not read is for a tag to be located at a null in the carrier field. Nulls typically occur at several points along a beam path between the interrogation antenna and the RFID transponder. Circularly polarized antenna exhibit the problem of vector rotation noise wherein the propagating electric field from the antenna rotates along a spiral path. If the electric field vector aligns with the transponder's strongest polarization, then the tag will readily read. On the contrary, if the field vectors are misaligned, the tags receive less energy and if they respond, will backscatter less energy to the RFID antenna and reader. The RSSI noise that is observed by the reader is typically about 4 dB from peak-to-peak which is over a 2× difference in returned signal strength. This noise confounds RFID tag localization efforts.

An operational solution to this problem is to scan again from a different angle, polarization angle, and or distance for reducing location errors.

Figure 1:
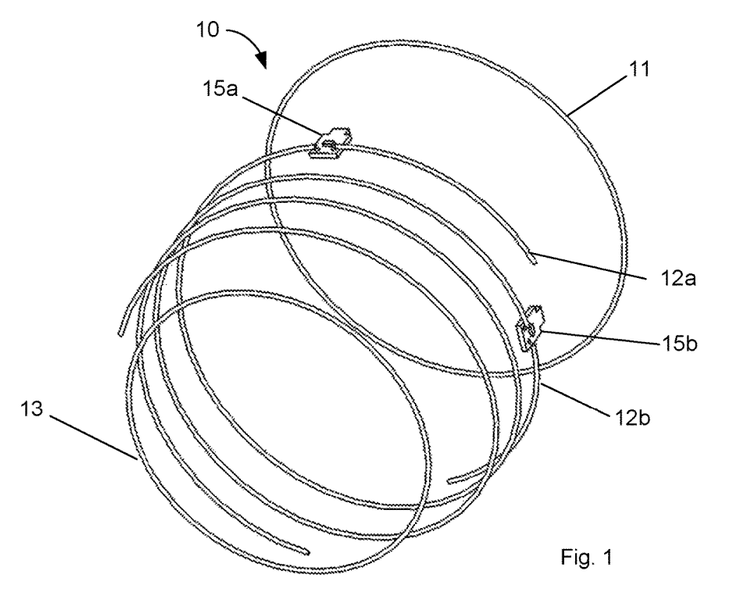
FIG. 1 is a directional dual-elliptical UHF RFID antenna according to one embodiment of the present invention.

Referring to FIG. 1, a preferred beam forming solution is to use dual elliptical antenna 10. It is a high gain circularly polarized four-element Quadix antenna, which is an improved antenna that is derived from a much larger, and heavier prior art 146 MHz Ham radio design by Ross Anderson W1HBQ. Antenna 10 has advantages such as minimal weight and minimal wind load due to its small surface area. Wind load force is calculated as one-half of the density of air times the velocity squared times the surface area presented to the wind. Antenna 10 has a reduced surface area, which when computed over the entire structure on all sides is about 150 square inches.

Preferred embodiments of antenna 10 uses 16 AWG half-hard brass wire for the elements. The total weight is about five ounces, and when weighed in grams in any case is less than 200 grams. With respect to a UAV, these are advantages over a high gain patch or panel antennae, a Yagi-Uda, or a conventional helix with the large reflector that it requires.

Figure 5:
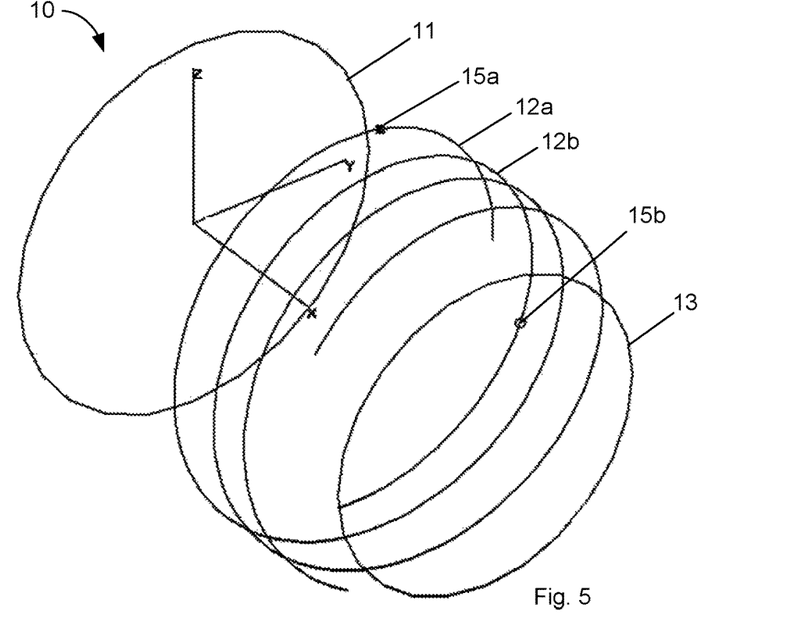
FIG. 5 is an RF model of a directional dual-elliptical UHF RFID antenna according to one embodiment of the present invention.
Figure 6:
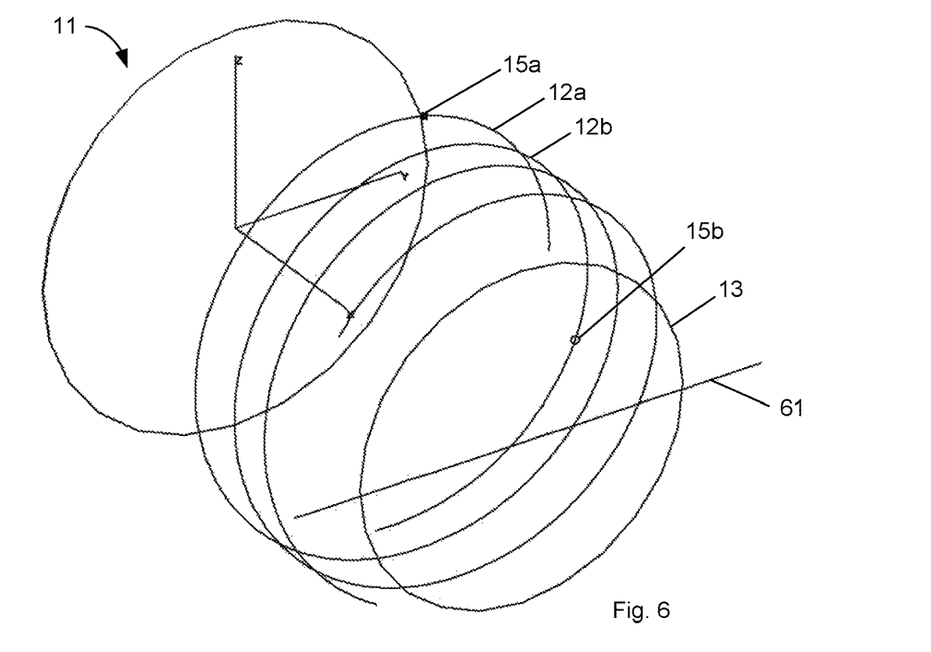
FIG. 6 is an RF model of a directional dual-elliptical UHF RFID antenna having a linear horizontal beam-forming element according to one embodiment of the present invention.

This novel antenna, designed for aerial RFID scanning is also related to a bifilar helical antenna wherein its traditional metal ground plane reflector that is typically used in prior art helical antennae, is replaced by the combination of toroidal reflector loop 11 and one or more director toroidal loops 13. FIG. 5 shows an RF model for that embodiment. In another preferred embodiment a director is formed by a second toroid-shaped loop having a smaller diameter than the reflector loop. In another preferred embodiment, the second director is linear re-radiating element 61, which is a linear horizontal beam-forming element as shown in the RF model of FIG. 6.

Figure 3:
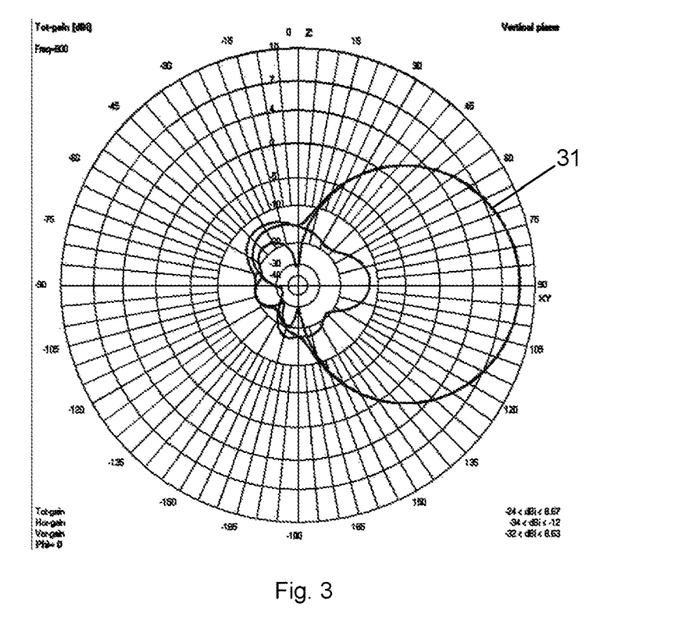
FIG. 3 is a beam pattern of the vertically polarized antenna structure.
Figure 4:
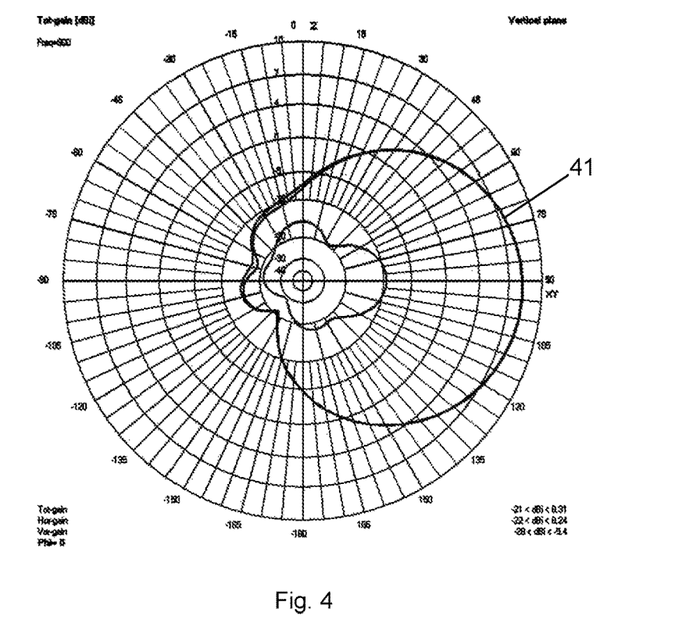
FIG. 4 is a beam pattern of the horizontally polarized antenna structure.

Referring now to FIGS. 3 and 4 the radio frequency beam patterns are shown. FIG. 3 shows beam pattern 31 for the vertical antenna, and FIG. 4 shows beam pattern 41 for the horizontal antenna.

Additional directors may be added to further enhance the beam forming. In a preferred embodiment, two, three, four or more linear metallic director elements are used to reduce the ellipticity of the vertical and/or horizontal polarized wave fronts, thus resulting in more linear wave fronts. Linear wave fronts have the advantage of consistent alignment of tag and antenna polarizations, regardless of distance along the beam path.

For interrogating RFID transponders the two exciters are fed by two different ports of two-port radio module, specifically an RFID interrogator such as the ThingMagic M6e-Micro. In a preferred embodiment, antenna port 1 is connected through coax cable 14a to balun board 15a of vertical exciter 12a, and antenna port 2 is connected through coax cable 14b to balun board 15b of horizontal exciter 12b. The balun is a bi-directional electrical device that converts radio frequency signals from balanced to an unbalanced signal. Preferred embodiments also use an impedance-matching circuit on the unbalanced side of the balun to match the impedance of the balun to a 50 ohm impedance: 50+j0 ohms. Preferred balun boards use a 4:1 balun, which would for example have a 200 ohm impedance on the balanced side and a 50 ohm impedance on the unbalanced side. The balun boards would also preferably have a matching network such as a PI network using capacitors and inductors to precisely match the impedances, including a 50 ohm impedance for the coaxial cable that connects the exciter to one port of the RFID interrogator. The preferred result is a low return loss of lower than −20 dB at selected frequencies within the 860-960 MHz range. In a preferred embodiment, the return loss for each antenna is less than −10 dB across the 902-928 MHz band, and a return loss of −25 dB at 915 Mhz. Also preferably, the horizontal and vertical polarizations preferably at any distance are within 2 dB of each other. In a dual-linear or dual elliptical antenna, the dominant polarizations are compared, specifically the vertical polarization of the vertical antenna compared to the horizontal polarization of the horizontal antenna.

For preferred embodiments with a 902-928 ISM band center-band frequency of 915 MHz, the reflector and exciters have a nominal diameters of 4.6 inches and the director has a nominal diameter of 3.8 inches. The exciter helical spacing is nominally 1.2 inches. Antenna elements, including the exciters, reflector, director(s), and balun boards are retained in place by a structure, preferably comprising plastic, such as acetyl copolymer, also known by the popular trade name Delrin. The plastic structure is preferably attached a to UAV using a mount such as a GoPro mount through an adapter that engages with mounting slot pair 17.

Figure 9:
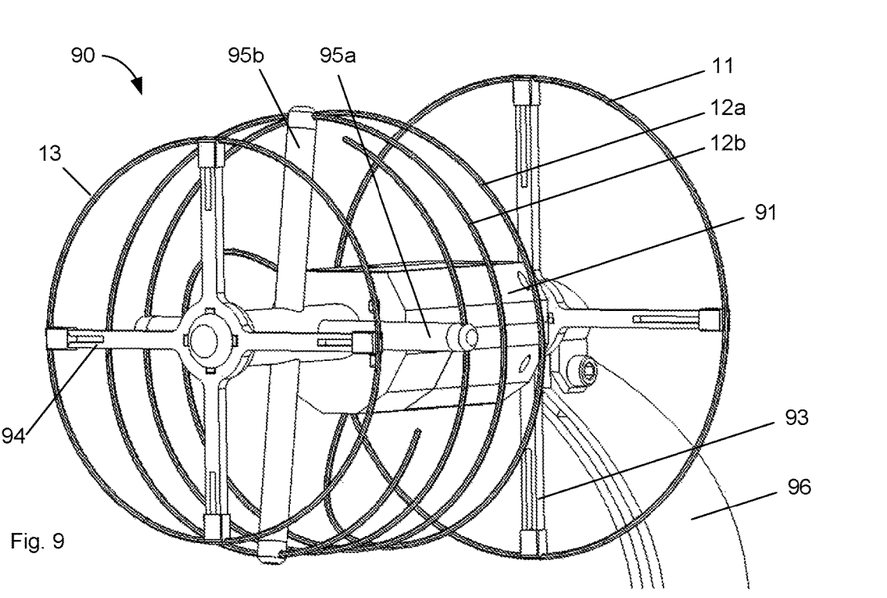
FIG. 9 is a directional dual polarization UHF RFID antenna with end-fed exciters according to one embodiment of the present invention.
Figure 10:
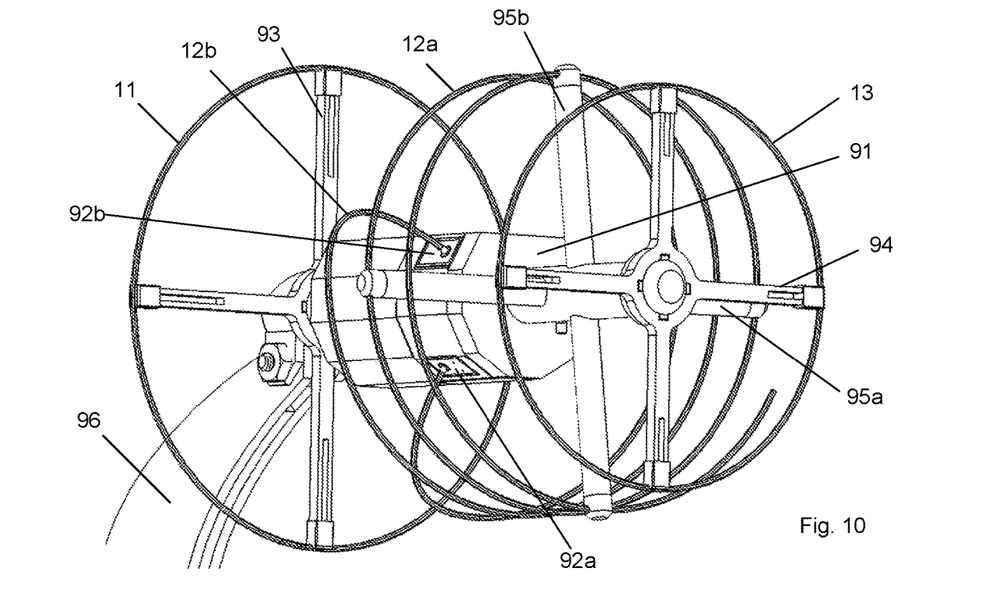
FIG. 10 is a directional dual polarization UHF RFID antenna with end-fed exciters according to one embodiment of the present invention.
Figure 11:
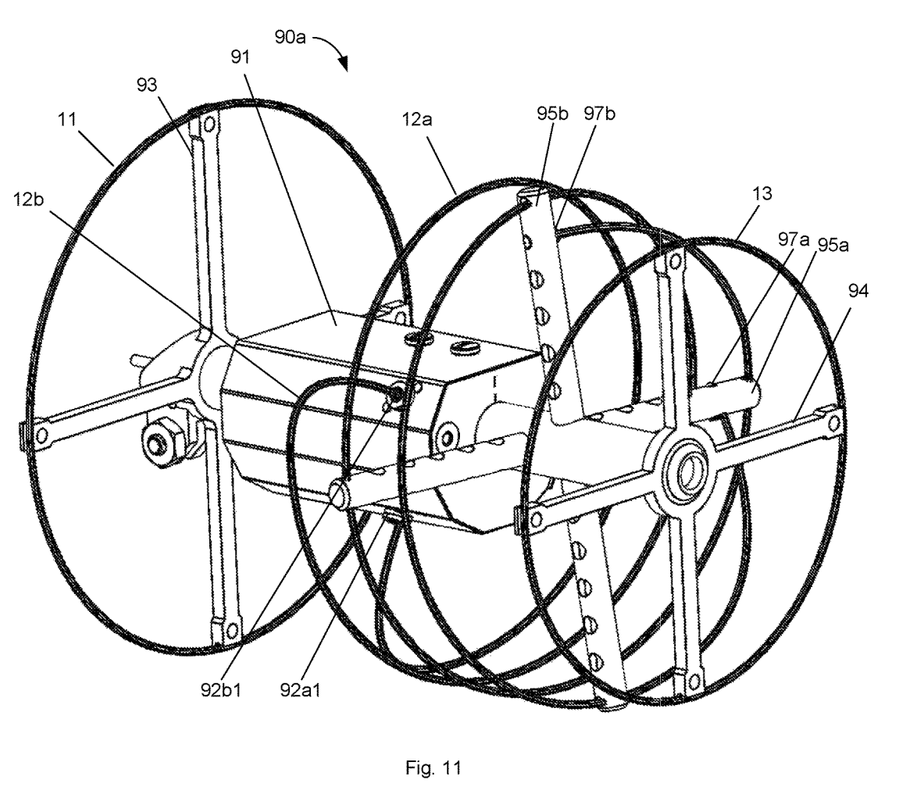
FIG. 11 is a directional dual polarization UHF RFID antenna with end-fed exciters and secured distal ends according to one embodiment of the present invention.

Referring now to FIGS. 9,10, and 11 is antenna 90 and 90a, preferred embodiments of a cross-polarized dual-elliptical antenna wherein the major elliptical axis is at least ten times greater than the minor elliptical axis, thus effectively being a dual-linear polarization antenna. For clarity, herein the word "above" refers to a relative direction along a vector, starting at a plane that bisects the toroid that forms reflector 11 and runs through the antenna bore sight axis toward the point in the field with maximum field strength. Antenna 90 and 90a are comprised of toroidal reflector loop 11 having a diameter of about 4.4 inches which is retained by plastic reflector support 93, a first helical exciter element 12a having a diameter of about 4.0 inches with about 1.2 inches between the turns located above of the reflector loop, a second exciter element 12b having a diameter of about 4.0 inches with about 1.2 inches between the turns located above and rotated ninety degrees to the first helical exciter element, and a toroidal director loop 13 having a diameter of about 3.7 inches which is retained by plastic director support 94 located above the second helical element 12b. Again for clarity, the location relationships described above are for an upward-pointing antenna 90 or 90a with the resulting beam pattern pointing upward above the antenna. In preferred embodiments the reflector, the two exciters, and the director elements are made of 16 AWG half-hard brass wire; when mechanically deformed, they return to their originally-manufactured shape in antenna 90. The toroidal reflector and directors are preferably formed and then held in a closed loop by soldering or brazing the ends together.

Unlike a Quadix antenna or antenna 10, antenna 90 and 90a have helical exciter elements that are end-fed at feed points 92a1 and 92b1 each preferably comprising a pin receptacle such as Mill Max part 0355-0-15-80-02-27-10-0 each respectively preferably retained by feed point printed circuit boards 92a and 92b. Feed point 92a1 is about 2.3 inches above toroidal reflector loop 11, and feed point 92b1 is about 0.34 inches above feed point 92a1. Both printed circuit boards 92a and 92b preferably having an impedance matching network comprising a series-connected fixed inductor and a shunt capacitor, both connected to the 150 to 200 ohm proximal end of the helical exciter elements. The two impedance-matching networks are preferably tuned for the best performance from 900 to 930 MHz; they are made using feed point printed circuit boards 92a and 92b for each wherein the 50 ohm unbalanced signal from an active radio circuit is connected through a coaxial cable that is terminated by a coaxial connector, the outer shield of which is preferably terminated to a local metal ground. The local metal grounds from both of the impedance-matching circuits are preferably connected to each other through a conductive metallic skin such as brass sheet metal or copper foil that is wrapped around a hollow central core 91 of a structural material such as plastic. Therefore antenna 90 and 90a have a hollow central core with its proximal end located about 0.8 Inches above the reflector toroid and a having an n-side polygon, wherein n can be any number from 3 to 100,000 or a regular or irregular polygon or instead is of a cylindrical shape, any of which with about a 1.5 inch cross section and a length of about 2 inches wherein the outer skin is conductive and provides a ground plane for the exciters and a Faraday cage for any circuits that are inside of it to reduce RF coupling of them with the electromagnetic fields moving in and around the antenna elements. The resulting relative orientation of the two impedance-matching circuits is 90 degrees to each other, like the 90-degree relationship between the two exciters. Within the hollow cavity of the supporting structure of the central core, there is space provided for radio modules or circuits, preferably comprising two RF (radio frequency) ports such as a dual-port RFID interrogator. In a preferred embodiment, an RFID interrogator such as the ThingMagic M6e-Micro or Impinj Indy RS2000 is embedded within the hollow core with a USB or serial data cable to provide power and communications extending out from it. The two U.FL RF connectors located at each of its two RF ports are connected to the RF connectors on each of the two impedance-matching circuits that feed the proximal ends of each of the two 90-degree oriented helical exciters 12a and 12b. In a preferred embodiment port 1 is connected to horizontal helical exciter 12b and port 2 connected to vertical helical exciter 12a. The RFID interrogator antenna interface circuitry alternates between port 1 and port 2 to drive an encoded carrier wave through antenna 90 to produce an electric field with a certain polarization. Then the RFID interrogator antenna interface circuitry then drives the other port to emit a second encoded carrier wave through antenna 90 to produce an electric field with a polarization that is about 90 degrees from the first wave. As the RFID interrogator stops modulating the outgoing carrier wave and listens to incoming backscatter from remote RFID transponders, it demodulates and decodes the RF signals that return from remote RFID transponders.

Unlike antenna 10, preferred embodiments of antenna 90 and 90a do not have baluns for connecting the unbalanced signal from the RFID interrogator to the somewhat more balance exciter elements. By not having a balun antenna 90 does not have insertion loss or return loss that are characteristic of a microwave balun; it also means though that return signal currents flow through the coax shield back to the active RF circuit resulting in the coax cable interfering with the formation of the desired radio beam pattern and preferred s-parameters at the feed points. Therefore the coax cables are preferably less than 2 inches long and located completely with the conductive skin of the hollow core of antenna 90 so that the coax cables do not significantly affect the radio beam pattern or s-parameters.

The first and second helical exciters are formed such that the proximal end of the exciter curls inward to connect with its antenna feed point as shown in FIGS. 9-11. The shape of the curl is preferably that of a spline that is tangent to the helical part and perpendicular to the plane of the feed point to which its proximal end terminates, the shape is preferably monotonic.

The conductive skin is preferably made of brass sheet metal or copper foil and is a good conductor of both electric current and heat. The radio gain stage, such as that in the M6e-Micro produces heat, especially at power levels above 27 dBm. The heat is preferably conducted to the outer skin of the hollow central core. Preferred embodiments use copper ground plane, via arrays, and folded brass sheet metal for efficient thermal transfer of heat from the RFID module to the outer conductive skin.

Horizontal helical support 95a is aligned with the horizontal plane of the antenna. Vertical helical support 95b is aligned with the vertical plane of the antenna. Helical supports 95a and 95b are preferably made of plastic and have minimal contact with exciters 12a and 12b. Vertical exciter 12a is preferably supported by horizontal helical support 95a at two low voltage points in the E-fields that circulate through vertical exciter 12a as shown in FIGS. 9-11. Horizontal exciter 12b is preferably supported by vertical helical support 95b at two low voltage points in the E-fields that circulate through vertical exciter 12a as shown in FIGS. 9-11. In FIG. 11 the distal ends of exciters 12a and 12b are preferably secured by pin receptacle 97a and 97b such as Mill Max part 0355-0-15-80-02-27-10-0 that are embedded into helical supports 95a and 95b respectively. Specifically, the distal end of vertical exciter 12a is supported by a pin receptacle that is embedded into vertical helical support 95b and the distal end of horizontal exciter 12b is supported by a pin receptacle that is embedded into horizontal helical support 95a.

Therefore, in preferred embodiments, the exciters are supported at four points: on the proximal end at the outer surface of the hollow core, at two low voltage points by a first helical support and lastly at the distal end by a second helical support.

In summary, antenna 90a is a dual polarization antenna for scanning RFID transponders comprising: a hollow central core 91 wherein the outer skin is electrically conductive; an RFID interrogator wherein the interrogator is located within the hollow central core 91 with a first 92a1 and a second 92b1 antenna feed point extending through the surface of the skin; a toroidal reflector loop located below the hollow central core; a first helical exciter element 12a located above the reflector loop wherein the proximal end of the exciter curls inward to connect with the first antenna feed point 92a1; a second helical exciter element 12b located above the first helical exciter element 12a wherein the proximal end of the exciter curls inward to connect with the second antenna feed point 92b1; and a toroidal director loop 13 located above the second helical exciter element.

In a preferred embodiment, antenna 90a further comprises a first non-conductive helical support member 95a and a second non-conductive helical support member 95b located above the first non-conductive helical support member 95a. The first exciter element 12a is preferably supported at two points by the first helical support member 95a and the second exciter element 12b is supported at two points by the second helical support member 95b. The first helical support member 95a also preferably supports the distal end of the second exciter 12b. The second helical support member 95b also preferably supports the distal end of the first exciter 12a.

ANSYS HFSS antenna modeling software will display E-field vectors that are preferably used to determine the locations of the low voltage points on the antenna elements.

The plastic materials for helical supports 95a and 95b can for example be comprised of ABS, Acrylic, Delrin, Nylon, CPE, or other resins; each different material has characteristic dielectric properties such as dielectric constant and dielectric loss tangent that affect the s-parameters of antenna 90 and the resulting beam pattern.

In another embodiment of antenna 90, the coax cables are longer, extending out from the hollow central core, through the center of the reflector loop, and out the back of the antenna. The conductive skin preferably has a shield connected to it that does not carry return signal back to an active external radio circuit.

Antennae 90 and 90a preferably have a return loss of about −17 dB, a directivity of about 8 dB, and a front-to-back ratio of about 20 dB. Antenna 90 and 90a while delivering these performance benchmarks and operating with dual orthogonal electric field propagation results in an RFID reader antenna with no nulls. This is a significant improvement over prior art RFID antennae. Since modern RFID transponders that are used for identifying assets such as retail items or their containers use simple, low cost antenna structures having a single linear polarization, they must be interrogated by an RFID interrogator and antenna that produce an electric field that has an E-field polarization that is aligned well enough to couple energy into and receive backscatter modulation from the RFID transponders.

Prior art RFID antenna that are currently in popular use produce a circular or elliptical field having an electric field (i.e. E-field) vector that rotates through 360 degrees at quarter wavelength intervals along its propagation path to and from remote RFID transponders (i.e. tag). As the E-field vector rotates, the RSSI of the return signal from an RFID tag varies by about 4 dB from peak to peak. These periodic peaks and nulls are the source of polarization vector noise that greatly reduces the location accuracy of swept beam asset location methods as described below. Antennae 90 and 90a do not have such peaks, nulls, or dead zones because there are two linear polarizations that are concurrently available for reading RFID transponders. This is a significant improvement over prior art. Therefore antennae 90 and 90a have unprecedented radio clarity over prior art.

Antenna 90 or 90a are preferably mounted to a robot or a UAV using plastic structural mount 96. Other preferred embodiments have a second toroidal director located above the first toroidal director for increased gain.

The present invention also herein teaches a frequency-scalable high gain dual polarization radio beam application platform; wherein as the dimensions of antenna 90 or 90a are scaled, the antenna and associated radio application platform will be responsive to signals in other radio frequency bands. For example to use antenna 90 or 90a in the European 865-868 MHz band, the scaling factor would be about 1.056. For operation in the 2400-2500 MHz ISM band a scaling factor of about 0.3735 would be multiplied by each of the dimensions taught above. For operation in the 3.65 GHz WiMax band, the scaling factor would be about 0.2507. For operation in the 4.9 GHz Public Safety band, the scaling factor would be about 0.1867. For operation in the 5.8 GHz ISM band, the scaling factor would be about 0.1578. As a preferred alternative now to circularly polarized antennae having periodic peaks and nulls resulting in polarization vector noise, scaled derivatives of antenna 90 or 90a provides unprecedented radio clarity (a.k.a. radioclarity) for other radio applications operating in other frequency bands.

For private, public, government, or military radio applications other than RFID such as radio communications, telemetry, telecommand, aeronautical radionavigation, radiolocation, earth exploration, space research for terrestrial, air-to-ground, space-to-earth, or space-to-space the hollow central core would preferably contain any combination of two-port radio modules or circuits known to those skilled in the art as receivers, mixers, filters, demodulators, decoders, encoders, and/or transmitters in order to perform functions for narrowband, wideband, or ultra-wideband applications.

Figure 8:
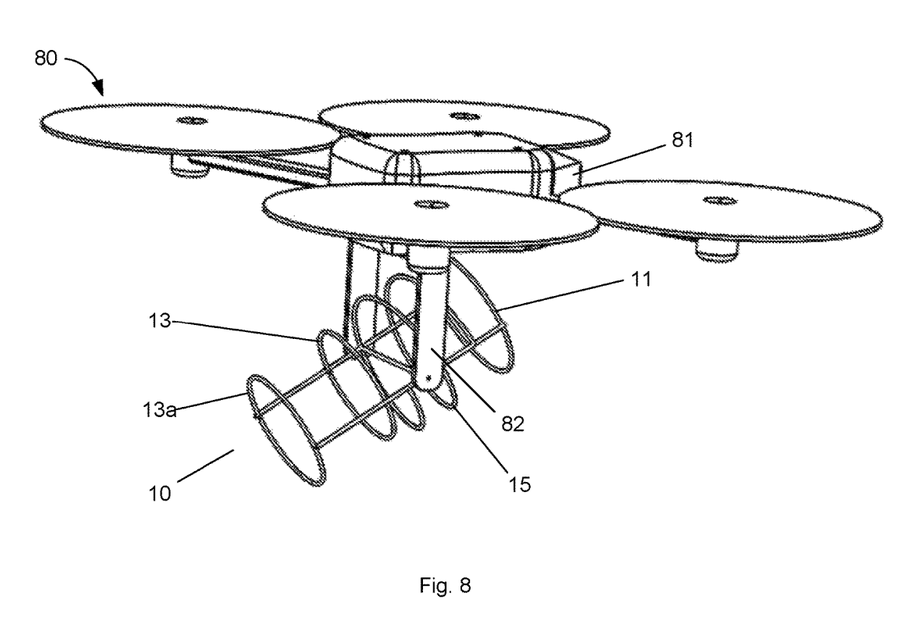
FIG. 8 is an unmanned aerial vehicle (UAV) with an aerial RFID antenna according to one embodiment of the present invention.

Referring now to FIG. 8 unmanned aerial vehicle (UAV) 80 of provides X, Y, Z, rho, theta, phi freedom of aerial mobility. There are several UAV platforms including a 2-wheeled robot with an antenna mast, coaxial bicopters, quadracopters, tri-copters, hexacopters, octocopters, and helicopters, that are adapted to carrying a directional UHF RFID reader 81 and antenna 10, 20, 90, or 90a for interrogation of RFID transponders.

In a preferred embodiment a winch spools and pulls power cabling within a hollow carbon fiber mast such as hexagonal tubing from Rock West Composites or Dragon Plate. The cable preferably lifts antenna 90a, preferably also having a controllable pitch and/or yaw angle to sweep and scan for RFID transponders.

Aerial robot 80 is preferably fabricated from molded plastic and machined aluminum fittings for the UAV frame and housing of the autopilot and RFID reader 81. Motors turn propellers (shown as a blur as if in rotation) to provide lift, propulsion and to control pitch, roll, and yaw. Commercially available quadcopters such as the Sky-Hero and multicopters from Align represent aerial platforms that are suitable for constructing aerial robot 80.

Aerial robot 80 is capable of movement in any direction and in preferred embodiments implements a scan pattern comprising vertical movements between vantage points.

The autopilot preferably contains a 3-axis accelerometer, gyroscope, digital compass, barometer, and CPU. Preferred Pixhawk PX4 embodiments use an ST Micro LSM303D MEMS accelerometer/magnetometer. The Pixhawk PX4 autopilot from Pixhawk.org is representative of this type of autopilot. It uses a 168 MHz/252 MIPS Cortex-M4F ARMv7E-M CPU with a floating-point unit. The PX4 also has 14 pulse width modulation (PWM) outputs to servo-control motors and control surfaces, including quad electronic speed control (ESC). In addition to serving navigation and control loop inputs, the accelerometer is preferably used to report the Z-axis angular attitude of aerial robot 80 and through a known offset angle, the vertical angular component of antenna 10 relative to the earth's gravitational field. The attitude of aerial robot 80 is preferably reported to a data collector, preferably using either a serial port (either synchronous or asynchronous) or a universal serial bus (USB).

The data collector is preferably at least comprised of a 32-bit CPU and 512M bytes of RAM that are preferably combined into a single module such as the Broadcom BCM2835 700 MHz ARM1176JZFS. A clock is used to time RFID data acquired from the RFID interrogator and aerial robot 80 attitude reports.

The CPU of the data collector preferably receives an asynchronous stream of RFID tag data from the RFID interrogator that in a preferred embodiment is a ThingMagic M6e-Micro, capable of sending data at a rate of up to 750 tag records per second. Tag read records preferably include Meta data such as RSSI and are preferably recorded in memory, including duplicate tag identification numbers. This is unlike prior art RFID tag readers such as handheld RFID tag readers in that prior art typically use a hash table or similar means to deduplicate tag sightings so that only a single tag sighting is reported, sometimes also with a count of the number of times that it was seen by the reader. In the present invention the CPU uses a time clock to timestamp tag sightings before they are stored in memory. In a preferred embodiment, the CPU and memory are combined within a single device such as the Broadcom BCM2835.

Memory preferably holds records of each tag read and their corresponding timestamp. Estimated flight position and attitude of aerial robot 80 are also recorded with timestamps. Preferred embodiments also run a flight pattern of rows along various headings in order to enhance RFID tag location data sets recorded in memory. Each point where RFID scan data is collected is a vantage point.

Vantage point computations preferably consider the downward angle of antenna 10 relative to the top plane of aerial robot 80 as shown in FIG. 8. Except when hovering in one place, aerial robot 80 also has angular offsets in pitch, roll, and yaw that must be considered. The gain and resulting beam shape of antenna 10 also determines the amount of angular uncertainty for each RFID tag reading.

A vital characteristic of the directional antenna is that it be both very light and have a minimal surface area in order to reduce wind load. Wind load is particularly important with respect to air rushing past the UAV's propellers and applying wind load pressure on the antenna, which increases the load on the UAV. Wind load is also a risk when operating the UAV scanner outdoors or in an area with large fans for air circulation, such as large industrial warehouses. Weight is always a concern for aircraft design; the antenna is a payload for the UAV aircraft to carry. Therefore, less weight is better. The present invention discloses an antenna that uniquely meets these vital characteristics.

GPS signals are preferably used for guiding robots while reading inventory such as cars in outdoor automobile lots.

There are many indoor locations where GPS signal strengths are too low for indoor GPS guidance. This section teaches solutions to that problem by using location references within the volume that is scanned for RFID-tagged inventory items. Unlike GPS, the scan volume may be indoors and/or outdoors.

The instant invention discloses location references that send or receive sonar pulses or send/receive laser light in order to provide location and heading information for robots.

The location references have locations within a constellation map that is communicated to the robot. In a preferred embodiment, the three dimensional location of each location reference are compiled to create a constellation map. The constellation map is preferably communicated to each robot via Wi-Fi. In a preferred embodiment, the constellation map of location references is transmitted using either TCP or UDP packets. Using UDP packet, the constellation maps are broadcast such that each mobile device in the vicinity can use an internal dictionary or database to lookup the location of each location reference by its designator number.

Figure 7:
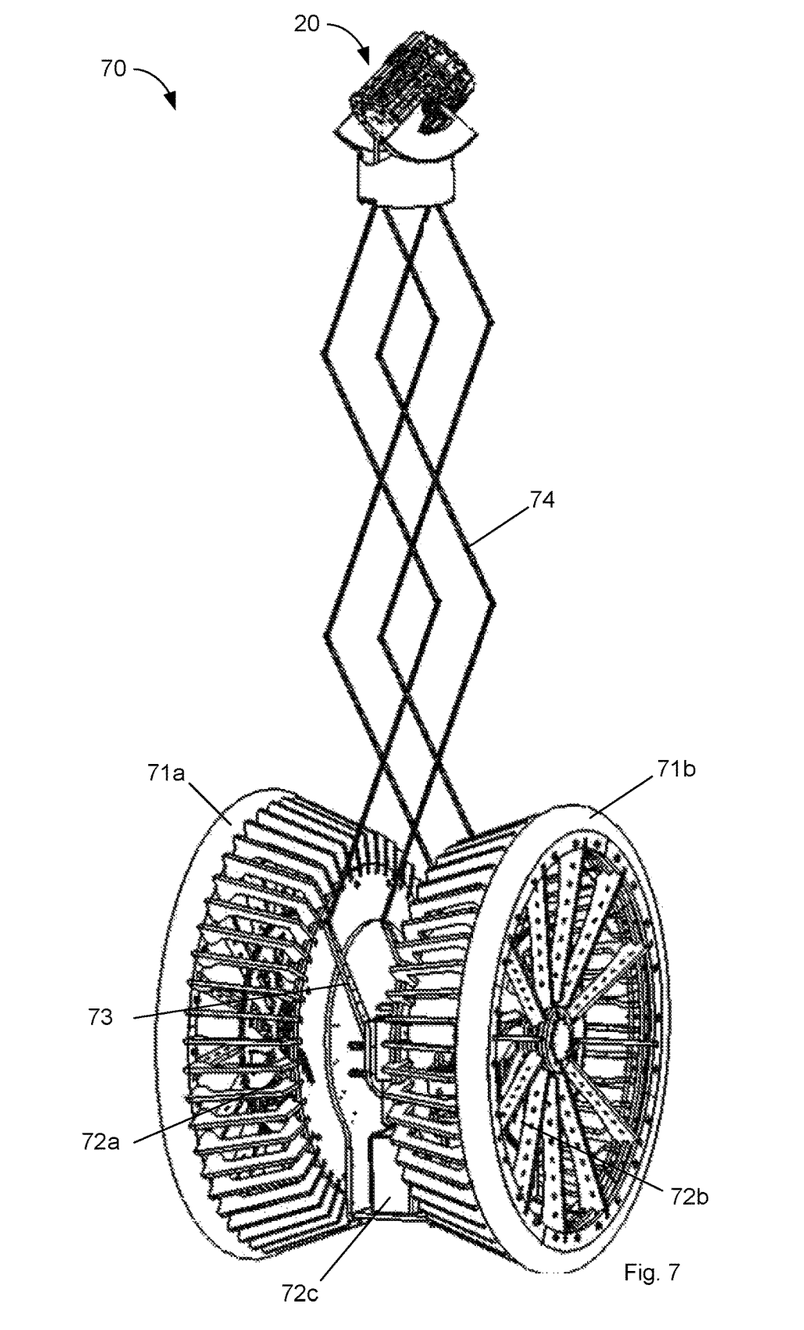
FIG. 7 is a two-wheeled robot with a scissor lift for aerial positioning of a directional UHF RFID antenna according to one embodiment of the present invention.

Preferred embodiments of robot 70 or UAV 80 use one or more VL53L1X laser ranging modules from ST. Each has a 940 nm VCSEL emitter (Vertical Cavity Surface-Emitting Laser) for a Time-of-Flight laser ranging module. It measures the distance to objects that reflect light, at ranges of up to 2 meters. Preferred embodiments use these small sensors to sense people and objects in the environment around robot 70 or UAV 80. They offer a key advantage for retail store scanning applications because the VL53L1X will sense fabric items such as saleable retail store apparel that would not be detectable by sonar sensors.

In a preferred embodiment, use a Lidar that emits laser light, preferably in the 600 to 1000 nm wavelength range. A laser diode is focused through a lens apparatus and directed using microelectromechanical systems (MEMS) mirrors for example. Preferred laser beam scan patterns include general forward-looking patterns, sweeping the area in front of the UAV, or patterns that sweep through broader angles including a full 360-degree field of view. Raster scan patterns sweep through yaw and azimuth angles. A Lidar receives and analyzes the reflections off of objects that surround robot 70. Return light is amplified and processed to create a map or to determine the position of robot 70 within an existing map for navigation.

Cameras are also preferably used with tracking the centroid of optical references, optical flow, and vanishing point navigation to recognize and guide a path for robots through aisles. Optical flow is the pattern of apparent motion of objects, surfaces, and edges in a retail store caused by the motion of the camera. Vanishing point navigation uses the parallel lines of store aisle, shelves, windows, and overhead lighting rails to compute a distant target, such as the end of an aisle; it also provides visual angular alignment for squaring the robot for accurate triangulations and transponder location measurements.

Beams and optical patterns of various types are dispersed through the surrounding space in order to provide an optical point of reference. In some embodiments dispersion is achieved using motion, moving mirrors, and/or other optical elements. In other embodiments, dispersion is achieved using fixed optical elements.

Robot 70 reads the identity and actual locations of RFID-tagged merchandise. Robot 70 as shown in FIG. 7 determines the locations of tagged goods in retail stores. In this preferred embodiment, there are two wheels 71*a* and 71*b* that independently rotate in either a clockwise or counter-clockwise direction to create forward or reverse motions of robot 70 or in opposing directions for a route turn or rotation of robot 70 about a fixed point on the floor.

Battery 72*c* is mounted below axles of wheels 71*a* and 71*b* to provide a low center of gravity; the result is inherent stability, unlike that of a classic inverted pendulum robot or a Segway human transporter.

As robot 70 traverses a retail sales floor or inventory storage areas, it may from time to time encounter obstacles in an otherwise flat surface. Robot 70 is preferably comprised of accelerometers and a three-axis gyroscope that detects changes in position and angular orientation. A robot controller such as a tablet, iPad, ODROID XU4, or Intel Compute Stick preferably detects and responds to changes in orientation under the control of algorithms that take into account the duration of the disturbance and historically related information. Controller 70 preferably learns by recording previous encounters with obstacles at certain locations, and reuses successful maneuvers to escape from known obstacles.

Robot 70 is preferably comprised of proximity sensors such as sonar modules to detect obstacles and boundaries. Sonar modules preferably report range to objects that reflect acoustic waves and enable robot 70 to stop or to take evasive action. Escape maneuvers of robot 70 preferably include reversing, pivoting, and changing direction to go around obstacles such as walls, furniture, and movable objects.

The controller preferably communicates with an RFID reader located within housing 25 using a wired or wireless connection. Information from the RFID reader is preferably collected and stored. In a preferred embodiment, SGTINs are associated with location information. In some embodiments, location is information is augmented by reading fixed location RFID transponders that are encoded with location codes.

Transponder location information preferably references a system or references points that extend beyond the boundaries of the room or space in which robot 70 is operating. A plurality of transponders can therefore have a distance between them that is greater than the physical dimensions of the space that they are contained within. For example, in a preferred embodiment, RFID location transponders are encoded with high-resolution longitude and latitude information. A preferred location identifier for an RFID transponder uses GPS coordinates. Such a location system is preferably used to track the locations of goods on a global scale.

A database preferably collects transponder identities and locations from robot 70 and others like it in facilities around the world. The robots periodically upload data to the database as Wi-Fi, 3G, or 4G wireless services are available.

The database preferably comprises means to report the locations of associated transponders to consumer devices wherein the associations are defined by characteristics of the objects that the transponders are attached to. The associations preferably comprise characteristics that include and are defined by fashion, style, or personal preferences. The database preferably accounts for fashion and style changes and alters the associations so that consumers will be more likely result to buy.

In this and other embodiments the narrow beam improves transponder location accuracy by reducing off-axis reads and reflections that confound tag location efforts. When an aggregate number of such reads are processed using triangulation, then the resulting tag location accuracy is greatly improved over prior art systems, methods, and devices.

Figure 2:
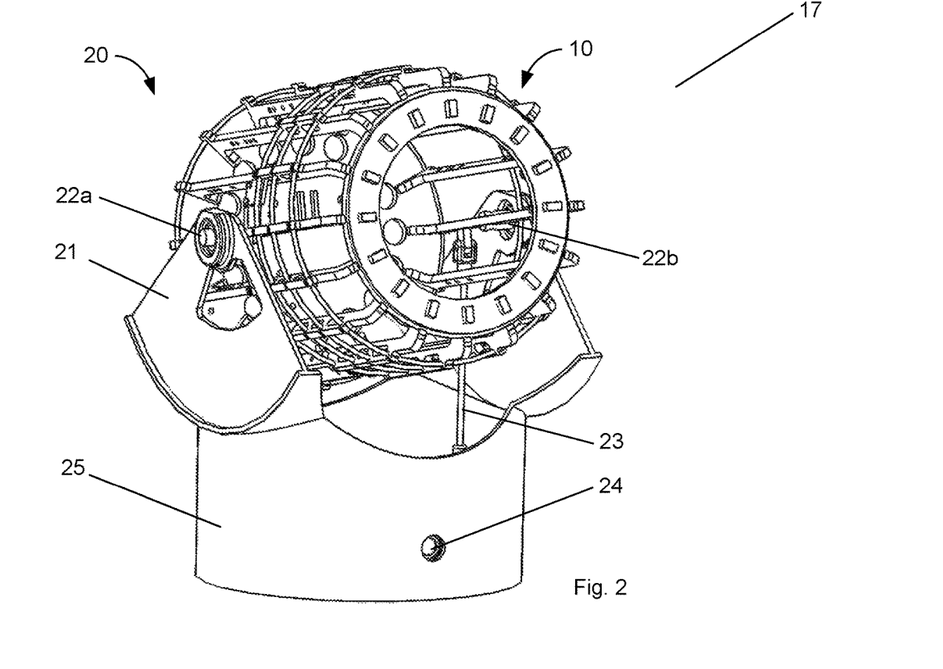
FIG. 2 is a directional UHF RFID antenna with pitch and yaw axis directional mobility according to one embodiment of the present invention.

In preferred embodiments, high gain antenna 20 rotates to generate multiple beam path vectors that result in multiple read occurrences for triangulation computations to reliably determine the location of each detected transponder. Preferred embodiments use a shaft encoder to measure the angle of antenna housing 25 relative to a body of robot 70.

Referring to robot 70 of FIG. 7, antenna 10 is free to rotate about its yaw axis to provide the item level inventory count and location accuracy that is demanded by retailers and needed for multi-channel shopping. The antenna must be swept in a methodical and controlled manner for triangulation computation as described above.

The above calculations are based on the use of narrow beam, high gain, directional antenna 10, 90, or 90a directed along selected vectors in order for the triangulation computations to be valid and accurate. In preferred embodiments, the antenna gain has a minimum of 8 dBic in order to form a narrow interrogation field from an RFID interrogator coupled with the antenna, for reading tags in a narrow sector of RFID-tagged inventory items at any one time. This narrowly focused beam reduces the probability that a scan will be blinded by un-modulated carrier being reflected into the receiver or for off-axis transponders to confound location by being illuminated and responsive to the carrier beam. Preferred embodiments detect amplifier saturation from blinding reflections and record the beam vector and location of blinding carrier reflections. Avoidance of or saving points of location reference are preferred uses of that stored information, enabling multi-dimensional alignment of scans from day to day.

Inventory rounds are preferably swept across the tag from multiple angles, preferably using a high gain antenna in order to reduce the magnitude of location error.

Intermediate transponder location data preferably comprises transponder observations that are used for triangulation computations. Scan results are preferably reported in stages, the second stage comprising: SGTIN; observation point (i.e. location of robot x,y,z); viewing angle (elevation and azimuth); and RF power level (db). Each stage is stored and processed to produce a computation of each tag's location using a descriptor comprising: SGTIN; and computed X, Y, Z Cartesian location. The processing comprises the steps of:

1) Match all first stage SGTIN observations and consolidate the detection records
2) Match any second stage observations to the consolidated first stage records
3) Combine the first and second stage records by formulating the three dimensional vector for both stages and compute the Cartesian point of intersection.
4) Match the result to any previous result of computed X, Y, Z location in a third stage. If there are no matches, then store as final stage transponder location data.

While the invention has been particularly shown and described with reference to certain embodiments, it will be understood by those skilled in the art that various changes in form and detail may be made without departing from the spirit and scope of the invention.

I claim:

1. A dual polarization antenna comprising:
   a hollow central core wherein the outer skin is electrically conductive;
   a two-port radio module wherein the module is located within the hollow central core with a first and a second antenna feed point extending through the surface of the skin;
   a toroidal reflector loop located below the hollow central core;
   a first helical exciter element located above the reflector loop wherein the proximal end of the exciter curls inward to connect with the first antenna feed point;
   a second helical exciter element located above the first helical exciter element wherein the proximal end of the exciter curls inward to connect with the second antenna feed point; and
   a toroidal director loop located above the second helical exciter element.

2. The antenna of claim 1 further comprising a first non-conductive helical support member and a second non-conductive helical support member located above the first non-conductive helical support member.

3. The antenna of claim 2, wherein the first exciter element is supported at two points by the first helical support member and the second exciter element is supported at two points by the second helical support member.

4. The antenna of claim 3, wherein the first helical support member supports the distal end of the second exciter.

5. The antenna of claim 3, wherein the second helical support member supports the distal end of the first exciter.

6. The antenna of claim 1, wherein the reflector, exciters, and director elements are made of half hard brass wire.

7. The antenna of claim 1, wherein the proximal ends of the exciters are fed by an impedance-matching network.

8. The antenna of claim 1, wherein the exciters are mechanically supported at low voltage points.

9. The antenna of claim 1, wherein the outer skin is thermally conductive.

10. The antenna of claim 1, wherein the diameter of the reflector element is about 4.4 inches.

11. The antenna of claim 1, wherein the diameter of the helical elements are about 4.0 inches with about 1.2 inches between the turns.

12. The antenna of claim 1, wherein the diameter of the director element is about 3.7 inches.

13. The antenna of claim 1, wherein the two-port radio module is an RFID interrogator.

* * * * *